United States Patent
Putnam et al.

(10) Patent No.: US 6,334,617 B1
(45) Date of Patent: Jan. 1, 2002

(54) COMPOSITE ABRADABLE MATERIAL

(75) Inventors: John W. Putnam, Glastonbury; Charles R. Watson, Windsor, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/471,758

(22) Filed: Mar. 2, 2000

(51) Int. Cl.⁷ .............................................. F16J 15/447
(52) U.S. Cl. ...................................... 277/415
(58) Field of Search ................................ 277/414, 943, 277/936, 415

(56) References Cited

U.S. PATENT DOCUMENTS

| 3,575,427 A | | 4/1971 | Lapac et al. |
| 3,918,925 A | * | 11/1975 | McComas |
| 4,257,735 A | * | 3/1981 | Bradley et al. |
| 4,349,313 A | * | 9/1982 | Munroe et al. |
| 5,702,111 A | * | 12/1997 | Smith |

* cited by examiner

*Primary Examiner*—Robert J. Sandy
*Assistant Examiner*—Karlena D. Schwing

(57) ABSTRACT

An abradable material for use at moderate temperatures which is particularly suited for use in the compressor sections of gas turbine engines. Abradable seals of the invention comprise an abradable silicone polymer matrix which contains a dispersion of hard abradable organic filler particles.

15 Claims, No Drawings

COMPOSITE ABRADABLE MATERIAL

BACKGROUND OF THE INVENTION

This invention relates to resilient composite abradable materials, and particularly to abradable materials for use in the compressor sections of gas turbine engines, and particularly in the low compressor section of such engines.

Modern large gas turbine engines have axial flow compressors which include multiple circular airfoil arrays mounted at the periphery of rotatable disks. Adjacent each set of moving compressor airfoils is an array of stationary airfoils. The efficiency of such a compressor is strongly affected by air which leaks around the ends of the moving airfoils. The typical approach to minimize such leakage is to provide an abradable air seal with which the compressor airfoil outer ends interact to minimize leakage.

U.S. Pat. No. 3,575,427 describes the abradable seal materials similar to those which are currently in use in engines produced by the assignee of the present invention. The seal material of U.S. Pat. No. 3,575,427 comprises a resilient matrix material containing a dispersion of friable hollow glass microspheres.

Applicants currently use such materials which comprise a silicone rubber matrix containing 15 to 50 volume percent of hollow glass microspheres as an abradable air seal material.

The evolution of gas turbine engines has been in the direction of higher operating temperatures. Temperatures in the compressor section of the engine have increased moderately, while temperatures in the combustor in turbine section have increased substantially since the development of the material described in U.S. Pat. No. 3,575,427.

In gas turbine engines with glass microballoon containing seals, when the abradable seals abrade, the glass microspheres are carried through the combustor and turbine sections of the engine. In modern engines, the temperatures in the combustor and turbine sections, are sufficiently high to cause the glass microspheres to soften or melt. It has been occasionally observed that these softened or melted glass microspheres have adhered to engine components and have blocked air cooling holes. Blockage of cooling holes is detrimental to engine component longevity.

Accordingly, it is an object of this invention to describe an abradable material for use in modern high temperature gas turbine engines. It is another objective of the invention to describe an abradable material which whose constituents will not subsequently adhere to combustor and turbine components. It is yet another object of the invention to describe a compressor of abradable material which exhibits higher erosion resistance over temperatures ranging from room temperature to 400° F. than the currently used material and is usable in temperatures up to 450° F., and exhibits desirable abradability characteristics.

SUMMARY OF THE INVENTION

Broadly stated, the invention comprises a high temperature resilient material comprised of a high temperature capable silicone polymeric material which contains a dispersion of high temperature capable organic particles. The particles are selected from a material which is stable to at least 400° F. The particles are present in the seal in an amount of about 10 wt %.

The silicone polymeric matrix is selected so as to be thermally stable at temperatures in excess of 300° F. and preferably in excess of 450° F. Most preferably the silicone polymeric matrix can withstand short temperature spikes of up to 550° F. without undue deterioration.

DESCRIPTION OF THE PREFERRED EMBODIMENTS

This invention comprises a matrix containing a particle or low aspect ratio (<10:1) fiber dispersion.

The phrase "abradable silicone polymer matrix" or ASPM is used herein as a defined term for a material that is a resilient one or two part silicone polymer catalyzed by a precious metal selected from the group consisting of Ru, Rh, Pd, Os, Ir, Pt and mixtures thereof, which is thermally stable at least 300° F. The cured ASPM material has a room temperature tensile strength of greater than 400 PSI, an elongation to failure of greater than 100%, and a Shore A (Durometer) hardness of from 15–50.

Preferably the ASPM material is a demethyl or methyl phenyl silicone.

Preferably the ASPM material contains a transition metal oxide selected from the group consisting of oxides of V, Cr, Ce, Mn, Fe, Co, Ni, or other transition metal and mixtures thereof with iron oxide being particularly preferred. The transition metal oxide acts as a thermal or thermal oxidative stabilizer.

Preferably the ASPM material is produced from a mixture of a vinyl terminated polymer having a molecular weight of 1,000 g/mol to 1,000,000 g/mol; a silane crosslinker having a molecular weight of 300 g/mol to 10,000 g/mol and a precious metal catalyst, most preferably Pt. The ASPM may also contain a reinforcing file such as fumed silica.

Preferably the room temperature tensile strength of the cured ASPM material exceeds 1,000 PSI.

Preferably the room temperature elongation to failure of the cured ASPM ma exceeds 800%.

Preferably the Shore A Durometer hardness of the cured ASPM material is about 15 to about 40.

Preferably the cured ASPM material is oxidation resistant, exhibiting less 2% weight loss after 100 hours (using a 1"×1"×¼" sample) at 300° F., and most preferably at 400° F. exposure in air.

Preferably the cured ASPM material is thermally stable, losing less than 20% of its tensile strength after 100 hours at 300° F., and preferably 400° F.

The phrase "abradable organic filler particles" or AOFP is used herein as a defined term meaning a material that is hard, organic, and that retains useful properties at 300° F. The AOFP material must contain less than about 2% S to ensure proper curing of the ASPM material. The AOFP material must have a glass transition temperature which exceeds 300° F. and a room temperature impact strength in excess of 0.5 ft-lb/$in_x$ to reduce the likelihood of particle breakage during abrading conditions in engine operation.

Preferably the AOFP material retains useful mechanical properties at temperatures in excess of 500° F.

Preferably the AOFP material contains less than about 2 wt % F so that the products of AOFP material combustion are not corrosive to gas turbine materials.

Preferably the AOFP material contains less than about 1 wt % S and less than about 1 wt % F.

Preferably the AOFP material produces only gaseous combustion products when combusted in a gas turbine engine at temperatures in excess of 2,000° F. generally oxidizing conditions.

Many organic materials contain fillers such as mica, glass particles etc. Preferably the AOFP material does not contain fillers. If fillers are present they must either combust completely, or be non combustable with softening temperatures in excess of 2500° F. and preferably in excess of 3000° F. Non combustable fillers preferably have a particle size of less than 1 mil.

Preferably the AOFP material has a glass transition temperature exceeds about 400° F.

Preferably the AOFP material has a Deflection Temperature, measured according to ASTM D 648, at 1.8 MPa, which exceeds about 400° F., and preferably exceeds 500° F.

Preferably the AOFP material has a room temperature tensile strength which exceeds 10 ksi.

Preferably the AOFP material has a room temperature elongation to failure which exceeds 1%.

Preferably the AOFP material has a room temperature Izod impact strength which exceeds 1.0 ft-lb/in.

The particles which are added to the matrix material serve to slightly weaken the matrix material, and make it more abradable. It is well within the ability of one skilled in the art to select the proper amount of particulate material for a matrix material having particular qualities to achieve the desired degree of abradability. We prefer to use from about 5 to about 20 weight percent particles.

The particles are preferably selected from the group consisting of polyamides, polyimides, polyamide-imides, as well as other thermoplastic and thermoset materials which are stable in the gas turbine compressor operating environment.

We particularly prefer a polyamide-imide known as Torlon 4000 which is available from the BP Amoco Company of Chicago, Ill. We prefer to use this material in an average particle size of 55 micrometers. A range of 35 to 75 micrometers appears to be a broad range for the average particle size. We prefer that 90% of particles have a size which is less than about 150 micrometers and that 90% of the particles fall in the size range of 10 to 125 micrometers.

Exemplary ASPM materials include:
a) LSR 5820 produced by the NuSil Company.
b) LSR 5830 produced by the NuSil Company.
c) Dow Corning Silastic GP-70 produced by the Dow Corning Company.
d) Visilox V-240 produced by the Rhodia Company.
Currently LSR 5830 is preferred.
Exemplary APM materials include:
a) Torlon available in several grades from BP-Amoco.
b) PMR-15, a NASA developed polyimide material commercially available from multiple sources, including Hycomp Corporation of Cleveland Ohio.
c) DMBZ, a NASA developed polyimide material commercially available from multiple sources including Hycomp Corporation.
We currently prefer Torlon 4000 available from BP-Amoco.

In the gas turbine compressor application the seal material will generally be located on the radially interior surface of a ring, which is located in the engine so that it circumscribes the tips of the moving airfoils, and the abradable seal will preferably be located in a shallow groove or depression in the ring. The depression will have a width which is comparable to and somewhat greater than the width of the compressor blades which will interact with the seal, for example 35–75 mm, and a depth of from 1 to 5 millimeters.

The ring will be metallic, typically aluminum or titanium, and may be formed in segments. The seal material is applied to the groove in the ring or ring segment as follows. The groove is cleaned using conventional techniques. We prefer to anodize the cleaned groove surface when producing new parts, when overhauling parts, we have used chromate conversion coating such as Iridite 14-2 from the MacDermid Company in Wallingford, Conn. on the groove surfaces. Anodizing and chromate conversion are preferred but may not be required for all applications.

While the invention materials previously described will adhere to metallic surfaces, whether bare, anodized or with a chromate conversion coating, adherence is generally improved through the use of an appropriate primer material which is applied to the surface prior to the application of the particulate filled polymer material. The primer material will generally be supplied or specified by the silicone matrix supplier, typical generally useful primers include DC-1200 primer from Dow Corning Company of Midland Mich., Visilox V-06 from the Rhodia Corporation of Troy N.Y. and SP270 from the NuSil Corporation of Carpenteria, Calif.

The ring or ring segment is provided with a mandrel which conforms to the inner surface of the ring sealing the groove and leaving an annular cavity to accept the particle filled silicone sealer of the invention. The mandrel has one or more apertures through which the silicone polymeric particle containing material can be injected.

The silicone polymeric particle containing material is injected into and fills the annular cavity. After the annular cavity is filled the apertures through which the material has been injected are closed and the filled ring or ring segment (along with the mandrel) is placed in an oven for curing. Curing is typically performed at temperatures between 300° F. and 400° F. for times of one to two hours or as otherwise recommended by the silicone producer.

After curing, the ring and mandrel are removed from the oven, the mandrel is removed, and the ring segment with the groove containing the silicone/particulate abradable rather may be further heat cured as appropriate.

The present invention will be better understood through reference to the following examples which are meant to be illustrative rather than limiting.

LSR 5820 or LSR 5830 (produced by the NuSil Corporation; LSR 5820 and LSR 5830 have Shore A Durometer hardnesses of about 20 and 30 respectively after curing) which has been thermally modified with iron oxide is combined with 10 weights per cent of Torlon 4000TF particles having an average size of 55 $\mu$m, and the filled silicone material is processed and cured as previously described, 2 hours at 300° F. and 2 hours at 400° F. The system is available as R3-2160 from the NuSil Corporation.

Seals fabricated from the resulting product provide equivalent abradability and 1.9 and 2.4 times the erosion life of current abradable seal materials (containing glass microballoons and as generally described in U.S. Pat. No. 3,575,427) when tested at room temperature and 400° F., respectively, in a laboratory erosion apparatus using 50–70 mesh Ottawa sand at 800 feet per second and a 20° incidence angle.

Although this invention has been shown and described with respect to detailed embodiments thereof, it will be understood by those skilled in the art that various changes, omissions, and additions in form and detail thereof may be made without departing from the spirit and scope of the claimed invention. Typical properties for the cured R3-2160 are a Shore A hardness of 32, a tensile strength of 680 psi and a tensile elongation of 600%.

What is claimed is:

1. An abradable material which comprises:
from about 5 to about 20 weight percent of Abradable Organic Filler Particles in an Abradable Silicone Polymer Matrix.

2. An abradable material as in claim 1 wherein the AOFP particles have an average size of 30–80 micrometers.

3. An abradable material as in claim 1 wherein the AOFP material has a room temperature Izod impact strength in excess of 1.0 ft-lb/in.

4. An abradable material as in claim 1 wherein the AOFP material contains less than 1 wt % S.

5. An abradable material as in claim 1 wherein the AOFP material has a glass transition temperature in excess of 300° F.

6. An abradable material as in claim 1 wherein the AOFP material is selected from the group comprising polyimides, polyamides, polyamide-imides, and mixtures thereof.

7. An abradable material as in claim 1 wherein the AOFP material produces only gaseous combustion products when combusted in a gas turbine engine.

8. An abradable material as in claim 1 wherein the abradable silicone polymer matrix comprises a dimethyl silicone or a methyl phenyl silicone.

9. An abradable material as in claim 1 wherein the ASPM contains a stabilizing material consisting of one or more transition metal oxides.

10. An abradable material as in claim 1 wherein the ASPM has been catalyzed by Pt.

11. An abradable material as in claim 1 wherein the cured ASPM has a room temperature tensile strength which exceeds 400 PSI.

12. An abradable material as in claim 1 wherein the cured ASPM has a room temperature elongation which exceeds 100%.

13. An abradable material as in claim 1 wherein the ASPM has a room temperature Shore A Durometer hardness of 15–75.

14. A gas turbine compressor abradable material which comprises:
   from about 5 to about 20 weight percent of Abradable Organic Filler Particles in an Abradable Silicone Polymer Matrix.

15. A gas turbine abradable seal which comprises:
   a) at least a segment of a ring, said ring being metallic;
   b) a groove in the inward surface of said ring;
   c) an abradable material located in said groove, said abradable material comprising:
      from about 5 to about 20 weight percent of Abradable Organic Filler Particles in an Abradable Silicone Polymer Matrix.

* * * * *